Patented Aug. 13, 1940

2,211,727

UNITED STATES PATENT OFFICE 2,211,727

METHOD OF REFINING SACCHARINE LIQUIDS

William A. La Lande, Jr., Upper Darby, Pa., assignor to Porocel Corporation, Philadelphia, Pa., a corporation of Arkansas No Drawing. Application November 18, 1939, Serial No. 305,210

5 Claims. (Cl. 127—55)

The present invention relates to a method of refining carbohydrate materials, and particularly saccharine liquors, for the removal therefrom of impurities such as coloring matter and ash-forming constituents, including soluble salts of calcium and iron.

A principal object of this invention is the refining of saccharine liquids, and especially aqueous solutions of sucrose, in such a manner that the refined solution will have a pH not substantially lower than that of the unrefined solution, and will have a higher degree of purity and a lower content of invert sugar and ash-forming constituents than it has been possible to obtain by the refining methods heretofore employed.

The crude materials which may be refined in accordance with this invention include solutions of raw cane or beet sugar in the natural state as expressed from the canes or roots; or the solution may be prepared by dissolving these crude crystallized sugars in water. Particularly amenable to refining in accordance with this invention are sugar refinery wash syrups or affination syrups; sugar liquors which have been subjected to defecation and mechanical filtration; granulated syrups; and sugar liquors and syrups in intermediate stages of manufacture. Or, artificially prepared glucose, such as is produced by the action of acids or other agents upon starchy materials, for example, maize or rice; or crude solutions of dextrin, such as are prepared from malt, may be refined by my process. Other crude materials which are amenable to refining in accordance with my invention are starch solutions, molasses, sweet potato syrup, corn syrup, glycerol, synthetic saccharne materials produced from cellulose, and the like.

Heretofore it has been conventional practice to refine saccharine liquids, and particularly crude sugar solutions, by filtration through decolorizing carbon such as animal char. By this treatment coloring matter is removed, but the increase in the degree of purity and the decrease in the content of invert sugar and ash-forming constituents obtained left much to be desired.

It has also been proposed heretofore to substitute for animal char, various other adsorbents or refining agents such as fuller's earth, diatomaceous earth, aluminum trihydrate, and dehydrated bauxite.

In the prior art, there is disclosed a process of decolorizing saccharine liquids by filtration through aluminum hydrate or bauxite which has been heated to dull redness, i. e., temperatures which have been ascertained to be from about 1000° F. to about 1050° F. This decolorizing adsorbent is substantially water-free aluminum oxide corresponding to the formula $Al_2O_3$.

Also in the prior art is disclosed the use of hydrated alumina which has been dried at 212° F., and which corresponds to the formula $Al(OH)_3$. This material is diffused through the water employed in blowing up the sugar and assists in the decolorization of the sugar solution. And the prior art likewise shows the use of gelatinous aluminum trihydrate in the clarification of sugar solutions. However, none of the agents nor methods above mentioned is capable of effecting refining or purification of sugar solutions to the extent attainable in accordance with my invention hereinafter set forth.

I have discovered that the temperature to which bauxite has been heated will have a profound effect upon the refining ability of such bauxite for carbohydrate materials, and particularly for sugar solutions. And I have further discovered that in order to obtain the optimum refining effect upon sugar solutions, bauxite should be heated to temperatures within a specific range, i. e., from about 600° F. to about 900° F., and preferably from about 600° F. to about 800° F., for a period of time sufficient to reduce the content of volatile matter (mostly water) to about 2.0% to 10.0% by weight. The bauxite is then cooled prior to use as a refining agent. The content of volatile matter (V. M.) is determined by heating the bauxite at 1800° F. for a period of time sufficient to obtain constant weight, usually about 30 minutes.

Bauxites prepared in this manner are characterized in having a greater refining efficiency for sugar solutions than bauxites which have been heated at temperatures either above or below the range above set forth. By employing bauxite which has been heated to temperatures of from about 600° F. to about 900° F., it is possible to refine sugar solutions to a higher degree of purity, and to a lower content of invert sugar and ash-forming constituents than can be obtained by refining such solutions with animal char, or with bauxite which has been heated to temperatures lower than about 600° F. or higher than about 900° F. Furthermore, the pH of sugar solutions which have been refined with bauxite which has been heated to temperatures of from about 600° F. to about 900° F. is not decreased to substantial extent, and in many cases is actually increased. Such bauxite is particularly adapted for the refining of sugar solutions having a relatively low pH, for example, of the order of from about 5.8 to about 6.5, since treatment with such bauxite may prevent substantial lowering of the pH, or may advantageously increase the pH to a value approaching 7.0. The lower the pH of a sugar solution the more rapidly will it deteriorate through inversion or subsequent heating, evaporation, and storage.

In accordance with the present invention, the saccharine liquid to be refined, for example, sucrose solution, is brought into intimate contact with bauxite which has been heated to temperatures of from about 600° F. to about 900° F., and preferably from about 600° F. to about 800° F., and thereafter cooled prior to use. Such contacting may be effected by percolating or filtering the solution through granular bauxite, for example, 20–50 mesh, at temperatures of from about 100° F. to 200° F., and preferably of from about 150° F. to about 180° F. Granular bauxite other than the aforementioned 20–50 mesh material may be employed, for example, any mesh size or combination of mesh sizes selected from and including 8 to 60 mesh is suitable. Or, the solution may be intimately admixed with finely-divided bauxite, such as 100–300 mesh, for a sufficient period of time to effect purification, and the bauxite containing impurities may thereafter be separated from the purified solution by settling, centrifuging, or filter pressing. In either case the bauxite containing impurities and residual sucrose solution may be water washed to remove and recover residual sucrose solution. The washed bauxite may then be dried and subjected to revivification, for example, by heating in the presence or absence of air, to temperatures of from about 600° F. to about 900° F. bauxites revivified by heating under non-oxidizing conditions, or in the presence of insufficient air to combine with all of the carbon resulting from the decomposition of organic matter adsorbed by the bauxite from the sucrose solution, usually exhibit a somewhat higher refining efficiency than revivified bauxites containing little or no carbonized matter.

My invention may be further illustrated by the following examples, wherein there is shown the results obtained in filtering a saccharine liquid, e. g., sugar refinery wash syrup or affination syrup, through 20–50 mesh bauxite which had been heated, in the presence of air, to various elevated temperatures, and cooled prior to utilization as a refining agent. The wash syrup or affination syrup was a relative impure sugar solution resulting from the washing of crude sugar. In all cases, the period of heating was of sufficient duration to reduce the volatile content (V. M.) of the bauxite to a constant value. A heating period of 30 minutes was found ample to produce this result. For comparative purposes there are included examples utilizing commercial bone-char, and bauxite which had been heated to temperatures both above and below the temperature range employed in accordance with my invention. All filtrations were performed at a temperature of 163° F.

| Properties* | Wash syrup | Wash syrup filtrates | | | | | |
|---|---|---|---|---|---|---|---|
| | | Bone char | Bauxite heating temperature | | | | |
| | | | 300° F. 30.3% V. M. | 500° F. 21.7% V. M. | 600° F. 8.2% V. M. | 700° F. 6.0% V. M. | 800° F. 3.7% V. M. |
| Purity (weight percent sucrose) | 75.07 | 78.19 | 75.84 | 81.72 | 85.75 | 85.65 | 84.49 |
| Invert sugar (weight percent) | 10.57 | 10.23 | 10.29 | 9.25 | 7.98 | 8.25 | 8.49 |
| Ash (weight percent) | 6.90 | 5.31 | 6.38 | 4.03 | 2.56 | 2.79 | 3.06 |
| Color (30 Brix) | 18.7 | 2.5 | 16.3 | 8.9 | 2.5 | 2.8 | 2.9 |
| pH | 6.4 | 6.3 | 6.3 | 6.8 | 6.9 | 6.8 | 6.7 |

| Properties* | Wash syrup filtrates | | | | | | |
|---|---|---|---|---|---|---|---|
| | Bauxite heating temperature | | | | | | |
| | 900° F. 2.0% V. M. | 1000° F. 1.3% V. M. | 1100° F. 0.6% V. M. | 1200° F. 0.7% V. M. | 1400° F. 0.2% V. M. | 1500° F. 0.3% V. M. | 1600° F. 0.015% V. M. |
| Purity (weight percent sucrose) | 84.14 | 83.06 | 81.65 | 80.62 | 79.75 | 78.90 | 78.35 |
| Invert sugar (weight percent) | 8.86 | 9.15 | 9.20 | 9.25 | 9.73 | 9.78 | 10.00 |
| Ash (weight percent) | 3.1 | 3.52 | 3.65 | 4.10 | 4.25 | 4.42 | 4.60 |
| Color (30 Brix) | 2.9 | 2.9 | 2.9 | 3.0 | 3.0 | 3.0 | 5.3 |
| pH | 6.5 | 6.2 | 6.1 | 6.1 | 6.1 | 6.0 | 6.0 |

*Dry basis. Organic non-sugars not shown.

Another series of filtrations performed upon a saccharine liquid of comparatively high purity, i. e., wash liquor, gave the following results. The wash liquor employed as charge to the filters was a relatively pure sugar solution having a high content of sucrose and a relatively low content of invert sugar and ash-forming constituents. As in the examples first given, the filtrations were performed at a temperature of 163° F.

| Properties* | Wash liquor | Wash liquor filtrates | | | |
|---|---|---|---|---|---|
| | | Bone char | Bauxite heating temperature | | |
| | | | 300° G. 30.3% V. M. | 500° F. 21.7% V. M. | 600° F. 8.2% V. M. |
| Purity (weight percent sucrose) | 98.57 | 99.64 | 98.78 | 99.30 | 99.77 |
| Invert sugar (weight percent) | 0.42 | 0.35 | 0.41 | 0.22 | 0.21 |
| Ash (weight percent) | 0.18 | 0.07 | 0.12 | 0.05 | 0.06 |
| Color (60 Brix) | 31.3 | 3.0 | 7.7 | 2.9 | 1.8 |
| pH | 6.7 | 6.3 | 6.4 | 6.8 | 6.7 |

*Dry basis. Organic non-sugars not shown.

| Properties* | Wash liquor filtrates ||||
| | Bauxite heating temperature ||||
| | 700° F. 6.0% V. M. | 800° F. 3.7% V. M. | 900° F. 2.0% V. M. | 1000° F. 1.3% V. M. |
|---|---|---|---|---|
| Purity (weight percent sucrose) | 99.40 | 99.47 | 99.41 | 99.74 |
| Invert sugar (weight percent) | 0.18 | 0.20 | 0.20 | 0.24 |
| Ash (weight percent) | 0.06 | 0.05 | 0.09 | 0.09 |
| Color (60 Brix) | 1.8 | 1.8 | 1.8 | 1.9 |
| pH | 6.7 | 6.7 | 6.6 | 6.3 |

*Dry basis. Organic non-sugars not shown.

From the examples above given, it at once becomes apparent that the optimum refining effect upon sugar solutions is obtained with bauxites which have been heated or calcined at temperatures substantially within the range of from about 600° F. to about 900° F. Bauxites heated within this range produce filtrates having a higher pH value, a higher degree of purity, and a smaller amount of coloring matter, invert sugar, and ash-forming constituents than filtrates from bone char or from bauxites heated to temperatures substantially above or below my preferred range of 600° F. to 900° F. While bauxites heated to 500° F. produce filtrates having a desirable pH value, optimum color removal is not obtained. On the other hand, bauxites heated to temperatures in excess of about 900° F., for example, 1000° F. to 1600° F., produce filtrates having undesirably low pH values. And, as the heating temperatures increase progressively from 1000° F. to 1600° F., the purity of the filtrates decreases, and the content of coloring matter, invert sugar and ash-forming constituents increases and tends to approach that of the unfiltered sugar solution. It is therefore highly advantageous to employ, in the refining of saccharine liquids, bauxites which have been heated to temperatures of from about 600° F. to about 900° F., in order to obtain the optimum refining effect. The crystallization of sugar from evaporated sugar solutions is markedly influenced by the relative amounts of invert sugar, ash-forming constituents, and other impurities present. In general, the lower the content of invert sugar and ash-forming constituents, the easier the crystallization of the sugar from the evaporated solution, the higher the yield of crystalline material, and the higher the purity of the product.

I have also found it advantageous in some instances to remove from granular bauxite prior to use, a substantial proportion of bauxite dust and/or inert materials normally associated therewith. Removal of dust and/or inert material tends to increase the overall efficiency of the bauxite by permitting more rapid filtration rates, increasing the adsorbent capacity, and decreasing the possibility of producing turbid filtrates. Dust may be removed from the granular material by screening, by air flotation or air blasting, or by water washing. Inert, relatively heavier non-bauxitic materials may be removed by any of the conventional separating devices, such as gravity separating tables, magnetic separators, and wet concentrating tables, or by flotation methods.

As has been pointed out hereinabove, the utilization of bauxites which have been heated to temperatures in excess of about 900° F., for example, temperatures of the order of from 1000° F. to 1600° F., produce filtrates having undesirably low pH values.

I have found that this difficulty may be overcome by admixing the bauxite which has been heated or calcined at these elevated temperatures, with a quantity of bauxite which has been heated at relatively lower temperatures, for example, from about 400° F. to about 900° F., and preferably from about 600° F. to about 900° F. Quantities of the latter bauxite may comprise from about 20% to 50% or more by weight of the mixture so produced. This procedure has been found effective regardless of whether the bauxite calcined at 1000° F. to 1600° F. is new bauxite, or revivified bauxite containing carbon from previous filtration and revivification operations. Since used bauxite containing carbon resulting from revivification at elevated temperatures usually exhibits a higher decolorizing efficiency than new bauxite, but has the disadvantage of producing filtrates of undesirably low pH value, it is apparent that my method of overcoming this defect is of considerable advantage. Furthermore, I have found that this same difficulty may be overcome by employing fuller's earth in lieu of bauxite calcined at temperatures of from about 400° F. to about 900° F. For example, new or revivified bauxite which has been heated or calcined at 1000° F. to 1600° F. and which tends to lower the pH of sugar solutions which may be filtered therethrough, may be admixed with from about 1% to about 15% by weight of fuller's earth, preferably granular fuller's earth which has been heated to temperatures of from about 800° F. to about 1200° F. prior to use.

In some instances it has been found that filtration of sugar solutions through bone char results in a decrease in the pH of the solutions. Such decrease may be offset by employing a mixture of bone char and bauxite, the latter having been subjected to heating or calcining at temperatures of from about 600° F. to about 900° F. Or, in those cases in which bone char produces no substantial decrease in pH, it is of advantage to add to the bone char substantial proportions of bauxite heated within the range above set forth, since such bauxite overcomes the deficiencies of the char with respect to removal of invert sugar and ash-forming constituents contained in the impure sugar solution and may, in fact, produce a desirable increase in pH of the solution. Used mixtures of char and bauxite may be revivified by washing, and heating at temperatures of from about 600° F. to about 900° F., preferably under conditions not conducive to substantial oxidation.

In lieu of employing mixtures of bauxite heated at 1000° F. to 1600° F. and bauxite heated at 600° F. to 900° F.; or mixtures of bauxite containing carbon and bauxite heated at 600° F. to 900° F.; or mixtures of bone char and bauxite heated at 600° F. to 900° F. as above described, I may utilize the components of the mixture or mixtures successively. For example, I may contact or filter the carbohydrate solution, such as impure sucrose solution, first through bone char to remove color bodies and then through bauxite which has been heated at 600° F. to 900° F. to remove residual color bodies and to further deduce the content of invert sugar and ash-forming constituents of the solution. Additionally, since the initial treatment with bone char may decrease the pH of the solution, the second treatment with bauxite may increase the pH of the solution to a value not substantially less than that of the untreated solution.

Bauxites from a variety of sources, including, for example, the deposits of Arkansas, Georgia, Alabama, Brazil, Surinam, France, Hungary, and Greece, have been found to be satisfactory for the preparation of the sugar refining adsorbents described herein. It is to be understood that in lieu of or in addition to bauxite, other naturally hydrated aluminum oxides, such as gibbsite and diaspore, may be utilized for the manufacture of said adsorbent.

What I claim is:

1. The method of refining a saccharine liquid, which comprises bringing said liquid into intimate contact with bauxite which has been heated to a temperature within the range of from about 600° F. to about 900° F. for a period of time sufficient to reduce its volatile matter content to between about 2% to about 10% by weight, and thereafter cooled, thereby to remove impurities from said liquid, and thereafter separating the liquid from the bauxite.

2. The method of refining a saccharine liquid, which comprises bringing said liquid into intimate contact with bauxite which has been heated to a temperature within the range of from about 600° F. to about 900° F. for a period of time sufficient to reduce its volatile matter content to between about 2% to about 10% by weight, and thereafter cooled, thereby to remove impurities from said liquid, separating the purified liquid from the bauxite, washing from the bauxite residual impurities, and revivifying the washed bauxite by heating to a temperature within the range of from about 600° F. to about 900° F.

3. The method of refining a saccharine liquid which comprises filtering said liquid through bauxite which has been heated to a temperature within the range of from about 600° F. to about 900° F. for a period of time sufficient to reduce its volatile matter content to between about 2% to about 10% by weight, and thereafter cooled, thereby to remove impurities from said liquid.

4. The method of refining a saccharine liquid, which comprises bringing said liquid into intimate contact with a solid decolorizing adsorbent which tends to lower the pH of said liquid, and bauxite which has been heated to a temperature within the range of from about 600° F. to about 900° F. for a period of time sufficient to reduce its volatile matter content to between about 2% to about 10% by weight, and thereafter cooled, the latter being used in an amount at least sufficient to offset the tendency of said decolorizing adsorbent to decrease the pH of said liquid, thereby to remove impurities from said liquid, and thereafter separating the liquid from the adsorbent and bauxite.

5. The method of refining a saccharine liquid, which comprises filtering said liquid through a decolorizing adsorbent comprising bone char, and bauxite which has been heated to a temperature within the range of from about 600° F. to about 900° F. for a period of time sufficient to reduce its volatile matter content to between about 2% to about 10% by weight, and thereafter cooled.

WILLIAM A. LA LANDE, Jr.